June 26, 1928.
G. C. CARHART
1,675,021
TRANSMISSION GEARING
Filed Aug. 14, 1923
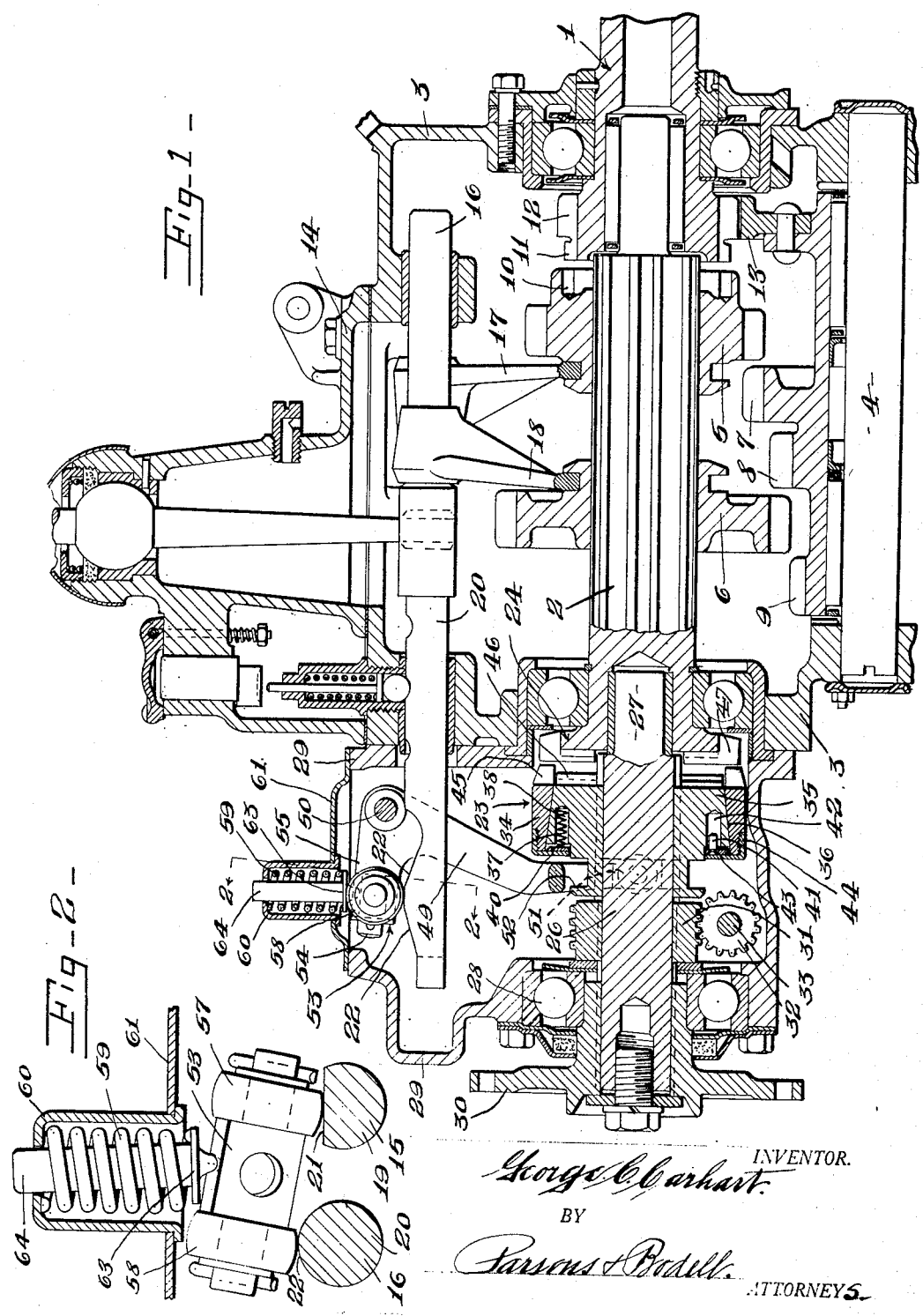
INVENTOR.
George C. Carhart.
BY
Parsons & Bodell
ATTORNEYS.

Patented June 26, 1928.

1,675,021

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

TRANSMISSION GEARING.

Application filed August 14, 1923. Serial No. 657,409.

This invention relates to transmission gearings, such as are used in motor vehicles and more particularly to such a transmission gearing having a clutch member which is shiftable into and out of engaging position to disengage the propeller shaft of the vehicle from the driven shaft of the gearing while the gears are being shifted and has for its object a particularly simple, efficient and durable means for shifting the clutch section during or preliminary and subconsequent to each gear shifting operation.

The invention consists in the novel features and in the combinations and the constructions hereinafter set forth and claimed.

In describing this invention, reference is had to the accompanying drawings in which like characters designate the corresponding parts in all the views.

Figure 1 is a side elevation, partly broken away, of a transmission gearing embodying my invention.

Figure 2 is a transverse sectional view taken on the plane of line 2—2, Figure 1.

This transmission gearing comprises generally a plurality of speed changing elements such as the usual shiftable gears and clutch, means for shifting said elements including parts individual to the shiftable elements or gears, an operating member movable to select and shift either one of said parts, a clutch including a shiftable member shiftable out of and into engaging position during each gear shifting operation and means operated by said parts for shifting or controlling the shifting of the clutch member.

The transmission gearing, as here shown, comprises driving and driven shafts 1, 2 journalled in the case 3 in axial alinement, a countershaft 4, also, journalled in the case 3, speed changing elements for gears and clutch sections mounted on the shafts some of such elements being shiftable and means for shifting said shiftable elements. The speed changing elements, as here shown, include shiftable gears 5, 6 mounted on the driven shaft 2 to rotate therewith and shift axially thereof into and out of engagement with gears 7 and 8 on the countershaft and into engagement with an idler gear, not shown, meshing with a gear 9 on the countershaft. The gear 5, also, has a clutch face 10 shiftable therewith into and out of engagement with the clutch face 11 associated with or fixed on the opposing end of the driving shaft 1. The driving shaft 1 is, also, provided with gear 12 which meshes with gear 13 on countershaft. The gear 5 is shiftable in one direction from neutral to engage the clutch faces 10, and 11 to produce direct drive or high speed and is shiftable in the other direction from neutral into mesh with the gear 7 to produce second speed. The gear 6 is shiftable in one direction from neutral into mesh with the gear 8 to produce low speed in the other direction into engagement with the idler not shown to produce reverse speed.

Means for selecting and shifting gears 5, 6 comprises a lever suitably supported in the cover 14 of the case 3 and having transverse movements to select either one of two parts individual to the gears 5, 6 and a movement in another direction to shift such parts. Such parts are here shown having a pair of rods 15, 16 shiftable endwisely in the case in a direction parallel to the shaft 2 and carrying forks 17, 18 coacting with the gears 5, 6 respectively, these rods having extensions 19, 20 at one end extending to the outside of the main case and provided with cam surfaces 21, 22.

23 and 24 designate the members of a clutch, which are normally engaged, and one of which is shiftable out of and into engagement with the other during each gear shifting operation. The member 24 is here shown as fixed on the driven shaft 2, and the member 23 as mounted upon an extension 26 of the driven shaft. This extension 26 has a pilot at 27 in the driven shaft in one end and is journalled at its other end in bearings 28 supported by a casing 29, attached to a wall of the main casing in any suitable manner, as by bolts or cap screws. The extensions 19 and 20 of the rods 15, 16 extend through the wall of the main case 3 and into the upper part of the case 29. The extension 26 of the driven shaft is connected at its outer or rear end to the propeller shaft of the vehicle, and is here shown as having a coupling member 30 as one section of a universal joint.

Also, suitable gearing for driving a speedometer is actuated by the extension 26, this gearing being here shown as a worm 31 mounted on the extension 26, and a worm gear 32 meshing with the worm and mounted on the shaft 33 which is coupled in any suitable manner as by a flexible shaft, to the speedometer.

The clutch member 23 is shiftable axially of the extension 26 into and out of engagement with the clutch member 24, and the members 24 and 23 are provided with coacting clutch teeth. The clutch member 23 may be of any suitable form, size and construction and is here shown as composed of outer and inner sections 34 and 35, having frictionally engaged conical faces 36 and means for holding the sections with such faces frictionally engaged.

This means is here shown as springs, one of which is shown at 37, each spring located in a recess 38 in the inner section and abuts at one end against the bottom of the recess and at its other end against an abutment ring 40, having shoulders or pins 41 at intervals arranged in recesses 42, similar to the recesses 38 in the inner clutch section, the pins or shoulders 41 alternating with the springs 37. The abutment ring 40 is held in position and also adjustable to adjust the tension of the springs, by a collar 43 having an angular flange 44 threading on the outer section of the clutch member 23. The teeth or jaws 45 on the outer section are longer than the teeth of the jaws 46 on the inner section in order to engage the teeth 47 of the member 24 in advance of the teeth 46 of the inner section. This construction of sectional clutch member tends to synchronize the rotative movements of the clutch members and the shafts on which they are mounted, during the shifting of the member 23 into engagement with the member 24. However in so far as this invention is concerned the clutch members may be of any suitable form, size and construction.

The means for shifting the clutch member 23 out of engagement with the clutch member 24, prior to the gear shifting operation and for shifting it back into engagement with the clutch member 24, after the gear shifting operation, is controlled in its actuation by the shifting rods 15 and 16; and as here shown, comprises a motion transmitting member, as a lever 49 pivoted at 50 to the case 29 and usually extending between the extensions 19, 20 of the rods 15, 16, this lever being preferably angular, and one arm thereof having a fork 51, coacting with a groove 52 in the hub of the shiftable clutch member 23, and the other arm thereof having means for coacting with the cam surfaces 21, 22, of the extensions 19, 20, of the rods 15, 16. This means comprises a lever 53 pivoted at 54 to the arm 55 of the lever 49 on an axis extending lengthwise of such arm or parallel to the rods 15, 16, so that the lever extends transversely of the arm 55, the lever 53 being shown as mounted upon a stud, at the rearward end of the arm 55 and as having followers as rollers 57, 58 on opposite sides of its pivot, which coact with the cam surfaces 21, 22. The lever 49 is actuated in one direction to withdraw the clutch section 23 from the clutch 24, by the action of one or the other of the cam surfaces 21, 22, on the lever 53. When the gears 5, 6 are in neutral position both rollers or followers 57, and 58 are engaged with the high points of the cam surfaces 21 and 22, and the clutch member 24 is out of engaging position, as shown in Figure 1. When either rod 19 or 20 is shifted in one direction or the other from neutral, as for instance the rod 20, the roller 58 coacts with the cam surface 22 and rides down one of the inclines of the cam 22, and the lever 53 moves downwardly about a fulcrum point located at the point of contact of the other roller 57 and the high point of the cam 21, so that, the lever arm 55 moves downwardly and in so doing shifts the clutch member 23 into engagement with the clutch member 24.

The downward movement of the lever arm 55 is effected by a spring 59 which yieldingly shifts the clutch member 23 into engagement with the clutch member 24. This spring 59 is here shown as located in a cap or thimble 60, suitably mounted in the cover 61 for a case 29, the spring 59 thrusting at one end against the top or cap of the thimble, and at its other end against a shoulder 63 pivoted on a pin 64, movable endwisely through the cap and the top wall thereof, the pin 64 having its lower end acting on the arm 55 of the lever 49, the lower end of the pin 64 as here shown thrusting against the immediate part of the lever 53 directly above the pivot thereof or thrusting against the lever 53 substantially in line with the lever arm 55. The cam surfaces 21 and 22 positively act on the lever 49, this action shifting the clutch member 23 out of engagement with the member 24, and the spring 59 yieldingly forces the clutch member 23 into engaging position. Owing to the lever 53 movement of either rod 15, or 16 is transferred to the shiftable clutch member through the single motion transmitting member or lever 49.

What I claim is:

1. In a transmission gearing, the combination with shiftable speed changing elements, and means for shifting said elements, comprising parts individual to said elements, said parts being formed with cam surfaces, of a clutch member shiftable out of and into engaging position during the shifting of each element, and means for shifting said member, comprising a motion transmitting member, a lever pivoted to the motion transmitting member on an axis extending transversely of the direction of the movement of the motion transmitting member, and transversely of said parts, the lever having followers on opposite sides of its axis coacting with the cam surfaces of said parts, whereby movement of one of said parts tilts said lever about the point of engagement of the other of said parts and the follower engaged therewith.

2. In a transmission gearing, the combination with shiftable speed changing elements, and means for shifting said elements, comprising parts individual to said elements, said parts being formed with cam surfaces, of a clutch member shiftable out of and into engaging position during the shifting of each element, and means for shifting said member, comprising a motion transmitting member, a lever pivoted to the motion transmitting member on an axis extending transversely of the direction of the movement of the motion transmitting member, and transversely of said parts, the lever having followers on opposite sides of its axis coacting with the cam surfaces of said parts, whereby movement of one of said parts tilts said lever about the point of engagement of the other of said parts and the follower coacting therewith, and the motion transmitting member is actuated in one direction by the movement of such lever, and a spring acting to shift the motion transmitting part in the opposite direction.

3. In a transmission gearing, the combination with shiftable speed changing elements, and means for shifting said elements, comprising parts individual to said elements, said parts being formed with cam surfaces, of a clutch member shiftable out of and into engaging position during the shifting of each element, and means for shifting said member, comprising a motion transmitting member, a lever pivoted to the motion transmitting member on an axis extending transversely of the direction of the movement of the motion transmitting member, and transversely of said parts, the lever having followers on opposite sides of its axis coacting with the cam surfaces of said parts, whereby movement of one of said parts tilts said lever about the point of engagement of the other of said parts, and the follower coacting therewith, and the motion transmitting member is actuated in one direction by the movement of such lever, and a spring acting to shift the motion transmitting part in the opposite direction, said spring acting on the lever transversely of the axis of the lever.

4. The combination with a transmission gearing, comprising shiftable speed changing elements, and means for shifting said elements, including parts individual to said elements, said parts being formed with cam faces, of a clutch including a member shiftable out of and into engaging position during the shifting of each element, means for shifting said member, comprising a lever pivoted between its ends, one arm being connected to the clutch member, a second lever mounted on the other arm of the first lever and pivoted thereto on an axis extending in a direction lengthwise of such arm, and having followers on opposite sides of its axis coacting with the cam surfaces of said parts, and a spring to move the first lever in one direction and hold the followers engaged with said cam surfaces.

5. The combination of parts movable in substantially parallel directions, a shiftable member, motion transmitting means between said parts and said member whereby said member is shifted by the operation of either of said parts, said means comprising a lever having an arm extending substantially parallel to said parts, a second lever pivoted to said arm on an axis extending lengthwise of the arm and said parts, the second lever coacting on opposite sides of its axis with said parts.

In testimony whereof, I have hereunto signed my name, at Syracuse, in the county of Onondaga, and State of New York, this 13th day of Aug., 1923.

GEORGE C. CARHART.